Patented Oct. 6, 1953

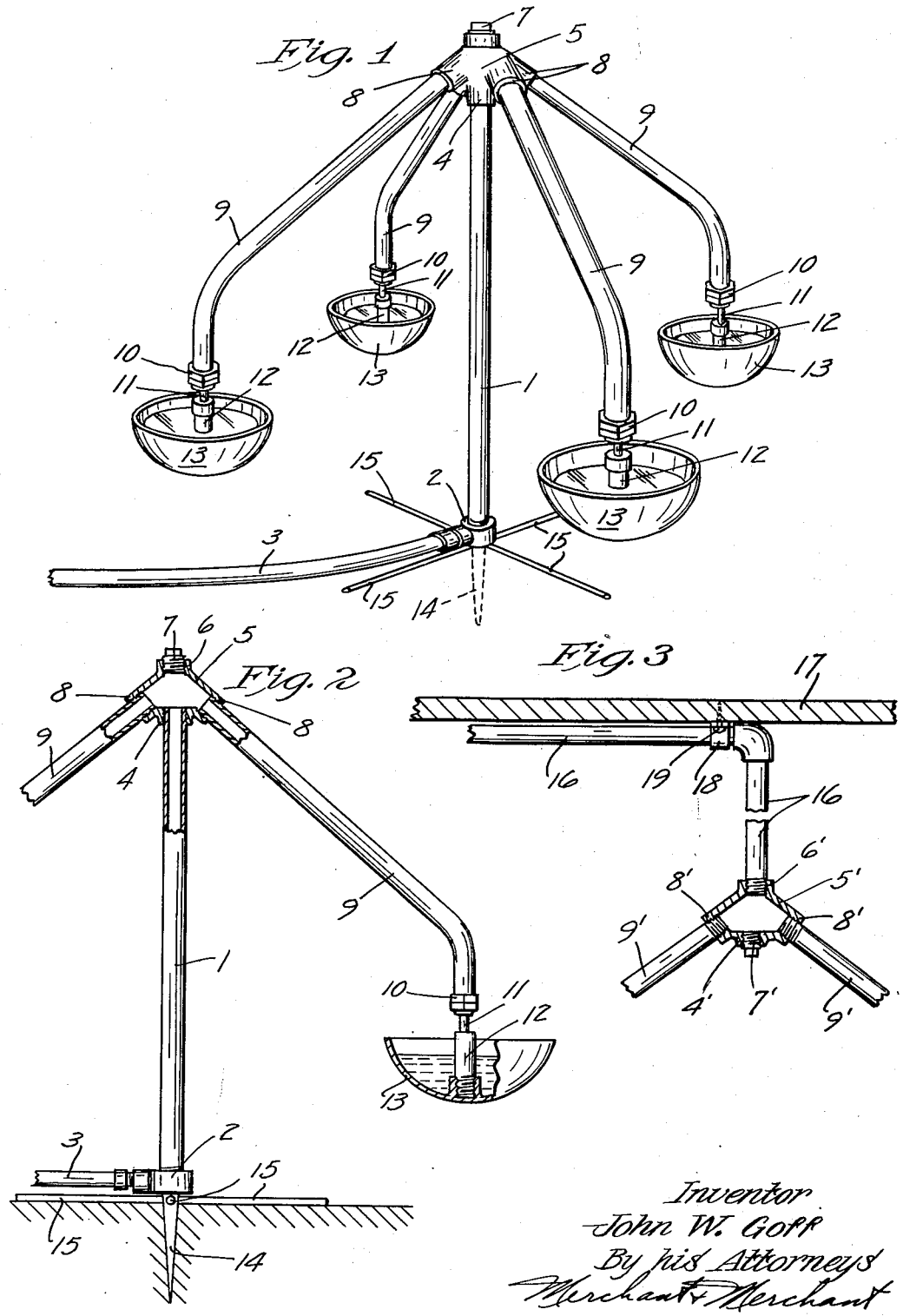

2,654,346

UNITED STATES PATENT OFFICE 2,654,346

POULTRY WATERING DEVICE

John W. Goff, St. Paul, Minn.

Application December 5, 1949, Serial No. 131,123

1 Claim. (Cl. 119—81)

My invention relates generally to devices for supplying feed or water to poultry and the like and, more specifically, to means for mounting a plurality of such devices on a single support.

An important object of my invention is the provision of supporting means for supply containers as set forth, which will suspend said containers in spaced relationship whereby access may be had to each container at all points about its periphery without interfering with free access to an adjacent container.

Another object of my invention is the provision of a single supporting means for a plurality of supply containers, said supporting means comprising a conduit supplying drinking water to said containers.

Another object of my invention is the provision of a poultry watering device as set forth, which may be readily moved from one place to another.

Still another object of my invention is the provision of means whereby the above supporting means may be projected upwardly from the ground or suspended from a ceiling or the like.

A still further object of my invention is the provision of a supporting structure, which may be utilized with the available mechanism disclosed and claimed in United States Patent No. 2,295,964, or 2,501,727 to achieve new and useful results.

Still another object of my invention is the provision of a supporting device for poultry watering bowls and the like, which is inexpensive to manufacture, rugged in construction, and durable in use.

Other highly important objects and advantages of my invention will become apparent from the following detailed specification, appended claim, and attached drawings.

Referring to the drawings, wherein like characters indicate like parts throughout the several views:

Fig. 1 is a view in perspective of a preferred embodiment of my novel watering bowl-supporting device;

Fig. 2 is a fragmentary view, partly in side elevation and partly in section, of the device of Fig. 1; and Fig. 3 is a view partly in side elevation and partly in vertical section, illustrating a modified arrangement.

Referring more specifically to the preferred embodiment of my invention, illustrated in Figs. 1 and 2, a vertical tubular supporting member or supply pipe 1 is shown as having its lower end threaded to engage the internally-threaded portion of a fitting 2, to which a water supply conduit 3 is rigidly secured. The supply conduit 3 is adapted to be connected to a source of water supply not shown and to deliver water under pressure to the pipe 1. The upper end of the supply pipe 1 has threaded engagement with the lower end 4 of a hollow head 5 and supplies water to the interior thereof. At its upper end, the head 5 is provided with a threaded opening 6 which is axially aligned with the opening in the lower end 4 and which is normally closed by a conventional pipe plug 7.

A plurality of circumferentially-spaced outlets 8 in the head 5 are threaded to receive the inner ends of radially outwardly and downwardly-extending tubular arms 9. At their outer ends, the tubular arms 9 are rigidly connected to couplings 10 from which extend downwardly pipe extensions 11 leading to valve mechanisms not shown but contained within valve casings 12. The valve mechanisms are of the type shown in United States Patent No. 2,295,964 or 2,501,727 and in themselves form no part of the instant invention. The lower end of each valve casing 12 is rigidly secured to the central bottom portion of one each of a plurality of drinking bowls or containers 13 and support the same in spaced relation to the ground. It should be observed that the valve mechanisms within the valve casings 12 operate to maintain a supply of water in the bowls 13 at predetermined levels.

For supporting the tubular member 1 in a vertical position, I provide a downwardly-projecting spike 14 rigidly secured to the bottom of the fitting 2 in any suitable manner. A plurality, as shown four, of horizontally-disposed circumferentially-spaced arms 15 project radially outwardly of the upper end portion of the spike 14 and are adapted to engage the surface of the ground when the spike 14 is driven thereinto. The radial arms 15 cooperate with the spike 14 to rigidly support the vertical supply pipe or member 1 and the drinking bowl-equipped arms 9 carried thereby against accidental overturning; and it should be obvious that the above construction permits the spike 14 to be easily withdrawn from the ground and the device to be easily moved from one location to another, as desired.

In the modified arrangement illustrated in Fig. 3, the head, arms, and drinking or watering bowls, not shown, are identical to those of Fig. 1 and 2 and carry the same numerals with prime marks added. The plug 7' provides a closure for the opening in the lower end 4' of the head 5', and a supply pipe 16 extends downwardly from a ceiling or frame member 17 by means of brackets or the like 18 screwed or otherwise secured to the member 17, as indicated at 19. The tubular arms 9' are screw-threaded into circumferentially-spaced outlets 8' in the same manner as the structures of Figs. 1 and 2.

It should be noted that the arms 9 are of a length to space the bowls 13 sufficiently apart to permit approach to each thereof at all points about its periphery without interfering with approach to adjacent bowls and without interference by the central supporting member or supply pipe 1 as in the case of Figs. 1 and 2. The bowls 13 are supported at a height to suit the poultry or livestock being watered; and the amount of foreign matter carried into the bowls 13 by the drinking or feeding animals is reduced to a minimum. While I have described the bowl or containers 13 as drinking or watering bowls, it should be obvious that the same may be utilized to contain dry feed, mash, or the like. In this instance, the material would be manually supplied to the containers.

My invention has been thoroughly tested and found to be completely satisfactory for the accomplishment of the objectives set forth; and, while I have shown a preferred embodiment and a single modified arrangement thereof, it should be understood that the same is capable of further modifications without departure from the spirit and scope of the invention as defined in the claim.

What I claim is:

In a device of the class described, an upright water supply pipe having a water supply conduit fitting at its lower end, a hollow head rigidly supported on the upper end of the pipe in communication therewith, a plurality of circumferentially spaced tubular water conducting arms in communication with said head and extending generally radially outwardly therefrom and terminating in downwardly directed end portions parallel with said pipe, a water receiving bowl and flow regulating device supported by each of said end portions, and means for retaining said pipe in upright position including a ground penetrating spike depending from said fitting and a plurality of ground engageable arms projecting radially from the spike.

JOHN W. GOFF.

References Cited in the file of this patent

UNITED STATES PATENTS

| Number | Name | Date |
|---|---|---|
| 527,005 | Roblin | Oct. 2, 1894 |
| 1,147,664 | Ward | July 20, 1915 |
| 2,087,176 | Webb | July 13, 1937 |
| 2,295,964 | Null | Sept. 15, 1942 |
| 2,335,281 | Jepson | Nov. 30, 1943 |
| 2,441,204 | Nusbaum | May 11, 1948 |